US012326995B1

(12) United States Patent
He et al.

(10) Patent No.: US 12,326,995 B1
(45) Date of Patent: Jun. 10, 2025

(54) TOUCH DETECTION CIRCUIT

(71) Applicant: HIMAX TECHNOLOGIES LIMITED, Tainan (TW)

(72) Inventors: Jia-Ming He, Tainan (TW); Yaw-Guang Chang, Tainan (TW); Zong-You Hou, Tainan (TW); Yi-Yang Tsai, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 18/408,605

(22) Filed: Jan. 10, 2024

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/04166* (2019.05); *G06F 3/0446* (2019.05)

(58) Field of Classification Search
CPC ..... G06F 3/04166; G06F 3/0412; G06F 3/044
See application file for complete search history.

(56) References Cited

U.S. PATENT DOCUMENTS

| 2015/0261340 | A1* | 9/2015 | Krah | G06F 3/0445 |
| | | | | 345/174 |
| 2018/0107309 | A1 | 4/2018 | Endo et al. | |
| 2018/0188865 | A1* | 7/2018 | Jang | H03F 3/45179 |
| 2021/0004103 | A1* | 1/2021 | Jang | G06F 3/04184 |
| 2021/0191561 | A1* | 6/2021 | Kim | G06F 3/04164 |
| 2021/0313401 | A1* | 10/2021 | Lee | G06F 3/04164 |
| 2022/0326831 | A1 | 10/2022 | Lee et al. | |

FOREIGN PATENT DOCUMENTS

EP 4365884 5/2024

OTHER PUBLICATIONS

"Search Report of Europe Counterpart Application", issued on Mar. 18, 2025, p. 1-p. 11.

* cited by examiner

Primary Examiner — Sardis F Azongha
(74) Attorney, Agent, or Firm — JCIPRNET

(57) ABSTRACT

A touch detection circuit includes at least one driving signal generator. The least one driving signal generator receives a first power voltage and a second power voltage as operation powers. Each of the at least one driving signal generator generates at least one driving signal based on the first power voltage and a second power voltage and each of the at least one driving signal swings between a first voltage and a second voltage, wherein the first voltage is a positive voltage and the second voltage is a negative voltage.

13 Claims, 9 Drawing Sheets

TOUCH DETECTION CIRCUIT

BACKGROUND

Technical Field

The disclosure relates to a touch detection circuit, and more particularly, to the touch detection circuit which can provide a driving scheme for reducing Electromagnetic Interference (EMI).

Description of Related Art

Due to the development of electric vehicles, there is an increasing demand for electronic products in an automotive field. In automotive applications, reducing electromagnetic interference (EMI) is very important, because there will be various electronic products in a car, in addition to navigation, audio and video equipment. In addition to the broadcast system, there are also various chips that control the operation of the car, such as autonomous driving, driving assistance systems, etc. Therefore, circuit design needs to avoid interference between these different electronic parts.

In the automotive touch applications, due to safety issues, glass cover of a panel will be thicker, and touch effect will be poor. For enhancing the touch effect, voltage of driving signal of a touch detection circuit will get higher, which will bring about another problem, that is, EMI will be more serious.

Please refer to FIG. 9A and FIG. 9B, which respectively illustrate waveform plot and a frequency response diagram of driving signal for touch detection operation of prior art. In FIG. 9A, when a touch sensing operation is activated, the driving signal DRV provided by a touch detection circuit may be a sine wave with amplitude modulation scheme. When a touch sensing operation is not activated, the driving signal DRV can be kept on 0V. It should be noted here, in prior art, an amplitude of the driving signal DRV is always a positive value when the touch sensing operation is activated. For provide enough voltage level, the amplitude of the driving signal needs to be raised to a relative high level, and EMI may be occurred.

In FIG. 9B, it can be seen that there are many frequency spectrums below a frequency TXF of the driving signal DRV, and each of magnitudes of the frequency spectrums below the frequency TXF is close or even higher lower than a magnitude of frequency spectrum at the frequency TXF. That is, EMI may be serious.

SUMMARY

The disclosure provides a touch detection circuit which can reduce interference of low frequency noise.

The touch detection circuit includes at least one driving signal generator. The least one driving signal generator receives a first power voltage and a second power voltage as operation powers. Each of the at least one driving signal generator generates at least one driving signal based on the first power voltage and a second power voltage and each of the at least one driving signal swings between a first voltage and a second voltage, wherein the first voltage is a positive voltage and the second voltage is a negative voltage.

Based on the above, the driving signal generator of the touch detection circuit is configured to generate the driving signal which swings between a positive voltage and a negative voltage. That is, a rise magnitude of the driving signal from a disable status to an enable status of the driving signal generator may be reduced. Such as that, Electromagnetic Interference (EMI) may be reduced, and performance of a touch sensing device can be enhanced.

DETAILED DESCRIPTION OF DISCLOSED EMBODIMENTS

Figure 1:
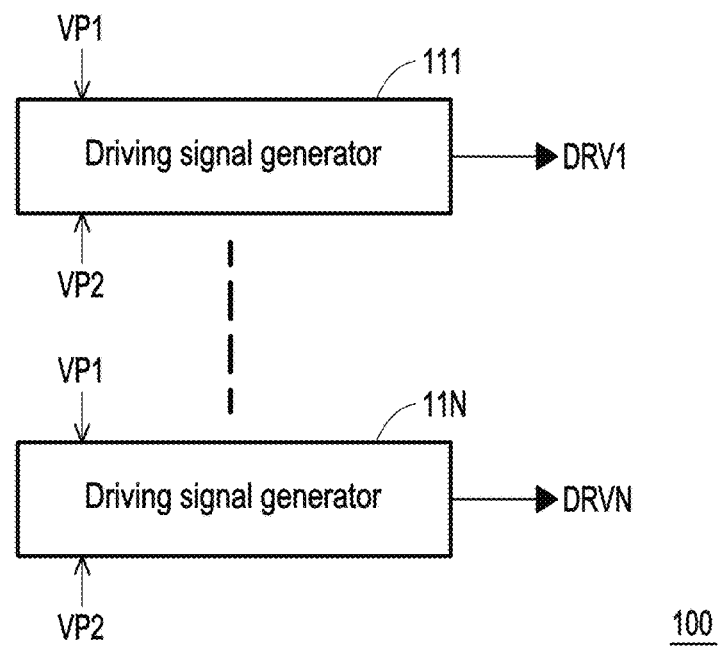
FIG. 1 illustrates a schematic diagram of a touch detection circuit according to an embodiment of present disclosure.

Please refer to FIG. 1, which illustrates a schematic diagram of a touch detection circuit according to an embodiment of present disclosure. The touch detection circuit 100 includes one or more driving signal generators 111-11N and the driving signal generators 111-11N respectively generates a plurality of driving signals DRV1-DRVN. The driving signal generators 111-11N provides the driving signals DRV1-DRVN to a plurality of touch sensing pads for operating touch sensing operation. The touch sensing pads may be capacitive touch sensing pads.

In present embodiment, each of the driving signal generators 111-11N receives a first power voltage VP1 and a second power voltage VP2 as operation voltages, wherein the first power voltage VP1 may be larger than the second power voltage VP2. The first power voltage VP1 is a positive power voltage, and the second power voltage VP2 is a negative voltage. Furthermore, each of the driving signals DRV1-DRVN generated by each of the driving signal generators 111-11N may swing between a first voltage and a second voltage, wherein the first voltage is a positive voltage and the second voltage is a negative voltage.

Figure 2:
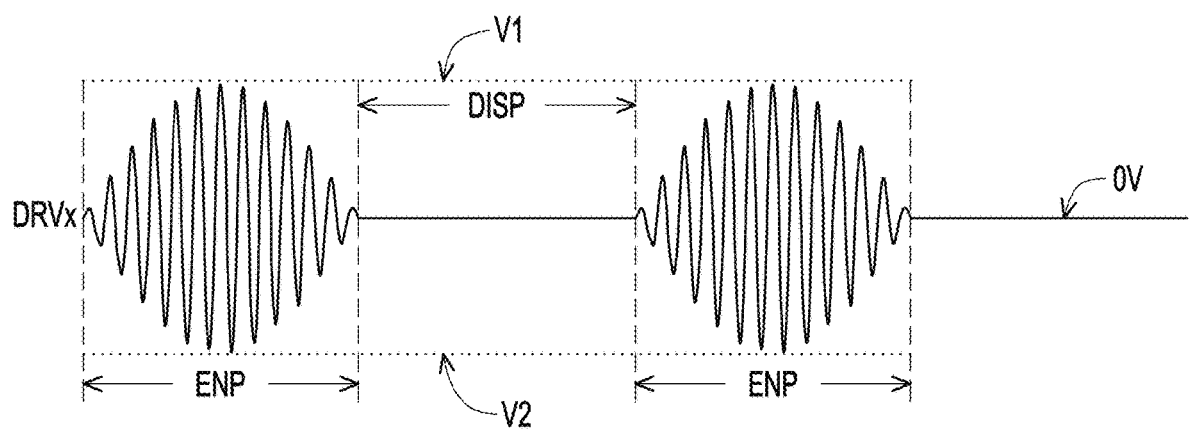
FIG. 2 illustrates a waveform plot of a driving signal generated by a driving signal generator according to an embodiment of present disclosure.

Please refer to FIG. 1 and FIG. 2 commonly, wherein FIG. 2 illustrates a waveform plot of a driving signal generated by a driving signal generator according to an embodiment of present disclosure. In FIG. 2, the driving signal DRVx may be any one of the driving signals DRV1-DRVN, and may be generated by corresponding driving signal generator 11x. When a touch sensing operation is activated, the driving signal generator 11x may generates the driving signal DRVx with a sine wave during an enable period ENP. In this embodiment, the sine wave of the driving signal DRVx may swing between a first voltage V1 and a second voltage V2, wherein the first voltage V1 is larger than 0V, and the second voltage V2 is smaller than 0V. Moreover, an amplitude of the sine wave of the driving signal DRVx can be modulated, and in this embodiment, the amplitude of the sine wave of the driving signal DRVx may be increased during a front half part of the enable period ENP, and the amplitude of the sine wave of the driving signal DRVx may be decreased during a back half part of the enable period ENP.

In this embodiment, an absolute value of the first power voltage VP1 received by the driving signal generator 11x is larger than an absolute value of the first voltage V1, and an absolute value of the second power voltage VP2 received by the driving signal generator 11x is larger than an absolute value of the second voltage V2. The absolute value of the first voltage V1 and the second voltage V2 may be same or different. The absolute value of the first power voltage VP1 and the second power voltage VP2 may be same or different, too.

On the other hand, when the touch sensing operation is not activated, the driving signal generator 11x may generates the driving signal DRVx equal to 0V during a disable period DISP.

Figure 3:
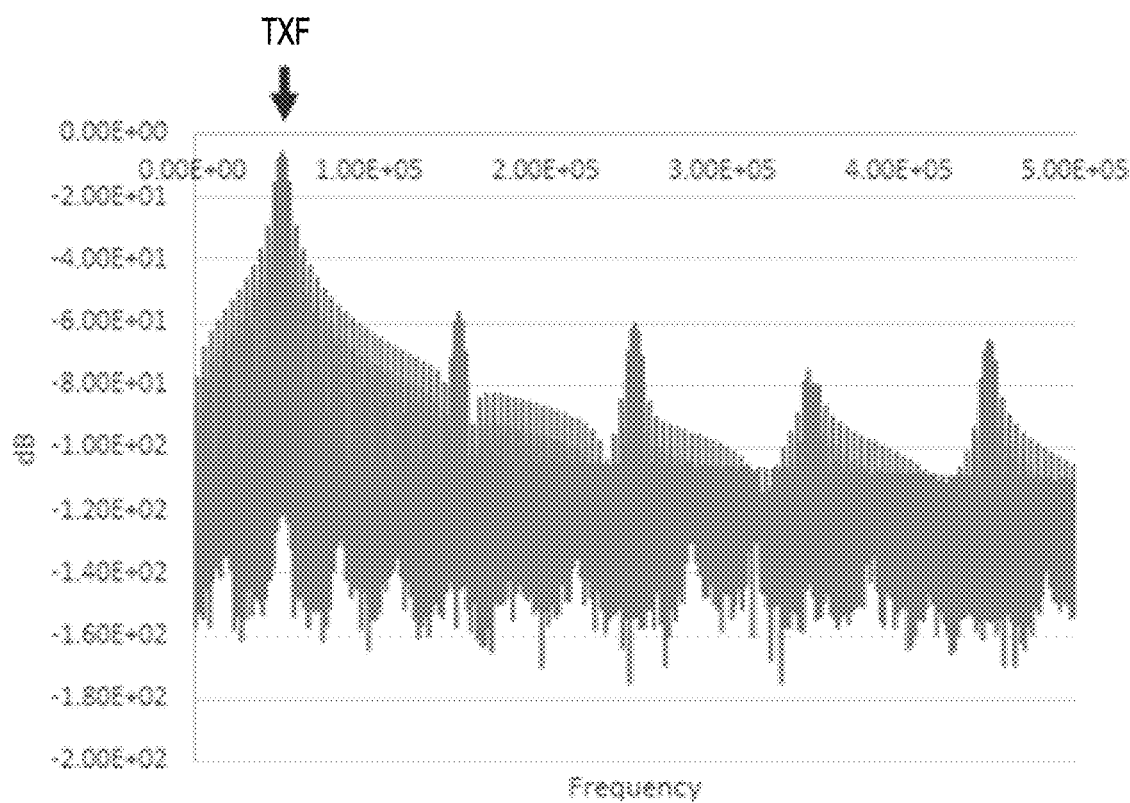
FIG. 3 is a frequency response diagram of the driving signal.

By generating the driving signal DRVx which transits between the first voltage VP1 and the second voltage VP2, a frequency response diagram of the driving signal DRVx can be seen as FIG. 3. In FIG. 3, it can be seen that each magnitude of each of frequency spectrums below a frequency TXF of the driving signal DRVx is lower than a magnitude of frequency spectrum at the frequency TXF. That is, an interference of low frequency noise is reduced, and performance of a touch sensing device can be enhanced correspondingly.

It should be noted here, the frequency response diagram may be obtained by performing a Fast Fourier Transform (FFT) on the driving signal DRVx.

Figure 4:
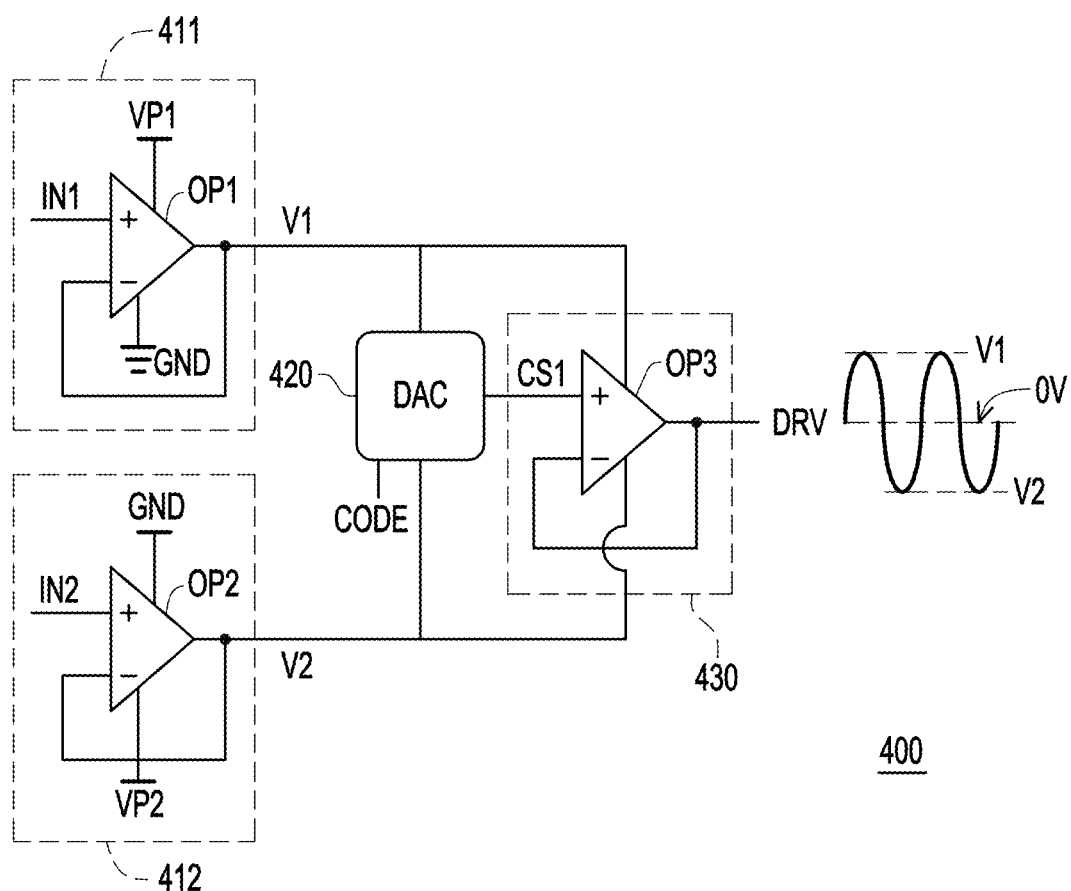
FIG. 4 illustrates a schematic diagram of a driving signal generator according to an embodiment of present disclosure.

Please refer to FIG. 4, which illustrates a schematic diagram of a driving signal generator according to an embodiment of present disclosure. The driving signal generator 400 includes a first voltage buffer 411, a second voltage buffer 412, a signal converting circuit 420 and a third voltage buffer 430. The first voltage buffer 411 is a voltage follower, and includes an operation amplifier OP1. A positive input end of the operation amplifier OP1 receives a first input signal IN1 and a negative input end of the operation amplifier OP1 is coupled to an output end of the operation amplifier OP1. The operation amplifier OP1 receives a first voltage VP1 and a ground voltage GND as operation powers.

The second voltage buffer 412 is also a voltage follower, and includes an operation amplifier OP2. A positive input end of the operation amplifier OP2 receives a second input signal IN2 and a negative input end of the operation amplifier OP2 is coupled to an output end of the operation amplifier OP2. The operation amplifier OP2 receives the ground voltage GND and a second voltage VP2 as operation powers.

The first voltage buffer 411 is configure to receive the first input signal IN1, and generates a first voltage V1. The second voltage buffer 412 is configure to receive the second input signal IN2, and generates a first voltage V2. In this embodiment, the first voltage V1 may be a positive voltage (larger than 0V), and the second voltage may be a negative voltage (smaller than 0V).

Besides, the signal converting circuit 420 is coupled to the output ends of the first voltage buffer 411 and the second voltage buffer 412 for respectively receiving the first voltage V1 and the second voltage V2 as power voltages. The signal converting circuit 420 further receives an input code CODE, and generates a converting signal CS1 by converting the input code CODE.

In this embodiment, the signal converting circuit 420 may be a digital to analog converter (DAC), the input code CODE is a digital code, and the converting signal CS1 is an analog signal.

The third voltage buffer 430 is coupled to the first voltage buffer 411, the second voltage buffer 412 and the signal converting circuit 420. The third voltage buffer 430 receives the first voltage V1 and the second voltage V2 as power voltages. The third voltage buffer 430 may be a voltage follower and includes an operation amplifier OP3. The operation amplifier OP3 receives the converting signal CS1 by a positive input end, and a negative input end and an output end of the operation amplifier OP3 are coupled together. The operation amplifier OP3 generates the driving signal DRV by the output end of the operation amplifier OP3, and the driving signal DRV may swing between the first voltage V1 and the second voltage V2.

It should be noted here, amplitude of the driving signal DRV can be controlled by the input code CODE. A positive peak value of the driving signal DRV may be equal or less than the first voltage V1, and a negative peak value of the driving signal DRV may be equal or larger than the second voltage V2. The input code CODE may be a time varying code and an amplitude of the driving signal DRV can be modulated according to a variation of the input code CODE as the driving signal DRVx shown in FIG. 2.

In this embodiment, the first voltage V1 may be 3V, and the first power voltage VP1 may be 6V. The second voltage V2 may be −3V, and the second power voltage VP1 may be −6V. The first voltage V1 may be half of the first power voltage VP1, and the second voltage V2 may be half of the second power voltage VP2. Or in some embodiments, the first voltage V1 may be the first power voltage VP1 multiplied by N, the second voltage V2 may be the second power voltage VP2 multiplied by M, wherein N and M are positive real numbers smaller than 1, and N and M may be same or different.

Figure 5A:
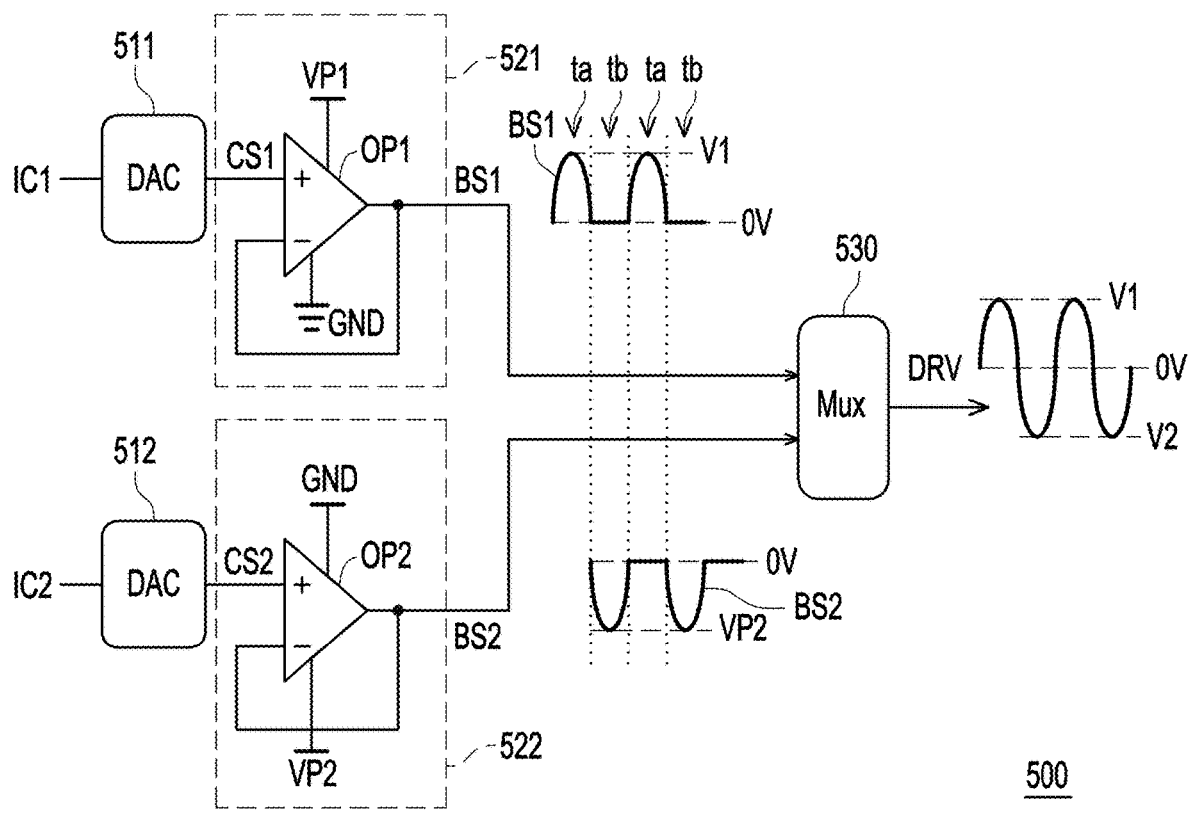
FIG. 5A illustrates a schematic diagram of a driving signal generator according to another embodiment of present disclosure.

Please refer to FIG. 5A, which illustrates a schematic diagram of a driving signal generator according to another embodiment of present disclosure. The driving signal generator 500 includes a first signal converting circuit 511, a second signal converting circuit 512, a first voltage buffer 521, a second voltage buffer 522 and a multiplexer (Mux) 530. The first signal converting circuit 511 and the second signal converting circuit 512 are digital to analog converter (DAC). The first signal converting circuit 511 receives a first input code IC1 and converts the first input code IC1 to generate a first converting signal CS1. The second signal converting circuit 512 receives a second input code IC2 and converts the second input code IC2 to generate a second converting signal CS2. The first voltage buffer 521 and the second voltage buffer 522 are respectively coupled to the first signal converting circuit 511 and the second signal converting circuit 512. The first voltage buffer 521 receives the first converting signal CS1 and generates a first buffering signal BS1. The second voltage buffer 522 receives the second converting signal CS2 and generates a second buffering signal BS2.

In detail, the first voltage buffer 521 includes an operation amplifier OP1. The operation amplifier OP1 receives a first power voltage VP1 and a ground voltage GND as operation powers. The first power voltage VP1 is a positive voltage. A positive input end of the operation amplifier OP1 receives the first converting signal CS1, and a negative end of the operation amplifier OP1 is coupled to an output end of the operation amplifier OP1. The first voltage buffer 521 is a voltage follower, and generates the buffering signal BS1 according to the first converting signal CS1. In this embodiment, the buffering signal BS1 may be kept on 0V in some time period or may be sine wave with an amplitude equal to a first voltage V1 in some other time periods, wherein the first voltage V1 is larger than 0V.

The second voltage buffer 521 includes an operation amplifier OP2. The operation amplifier OP2 receives a second power voltage VP2 and the ground voltage GND as operation powers. The second power voltage VP2 is a negative voltage. A positive input end of the operation amplifier OP2 receives the second converting signal CS2, and a negative end of the operation amplifier OP2 is coupled to an output end of the operation amplifier OP2. The second voltage buffer 522 is also a voltage follower, and generates the buffering signal BS2 according to the second converting signal CS2. In this embodiment, the buffering signal BS2 may be kept on 0V in some time period or may be sine wave with an amplitude equal to a second voltage V2 in some other time periods, wherein the second voltage V2 is smaller than 0V.

It should be noted here, when the buffering signal BS1 is kept on 0V, the buffering signal BS2 is the sine wave with a negative amplitude, and when the buffering signal BS2 is kept on 0V, the buffering signal BS1 is the sine wave with a positive amplitude.

The multiplexer 530 is coupled to the first voltage buffer 521 and the second voltage buffer 522. The multiplexer 530 generates a driving signal DRV by alternatively selecting one of the buffering signals BS1 and BS2. In detail, during time periods ta, the multiplexer 530 selects the buffering signal BS1 to generate the driving signal DRV, and during time periods tb, the multiplexer 530 selects the buffering signal BS2 to generate the driving signal DRV. Such as that, the driving signal DRV may be a sine wave swing between the first voltage V1 and the second voltage V2.

In additional, the voltage converting circuits 511 and 512 may be implemented by any digital to analog converter known by a person skilled in the art, and the multiplexer 530 also may be implemented by any signal multiplex circuit known by a person skilled in the art, no special limitation here.

Figure 5B:
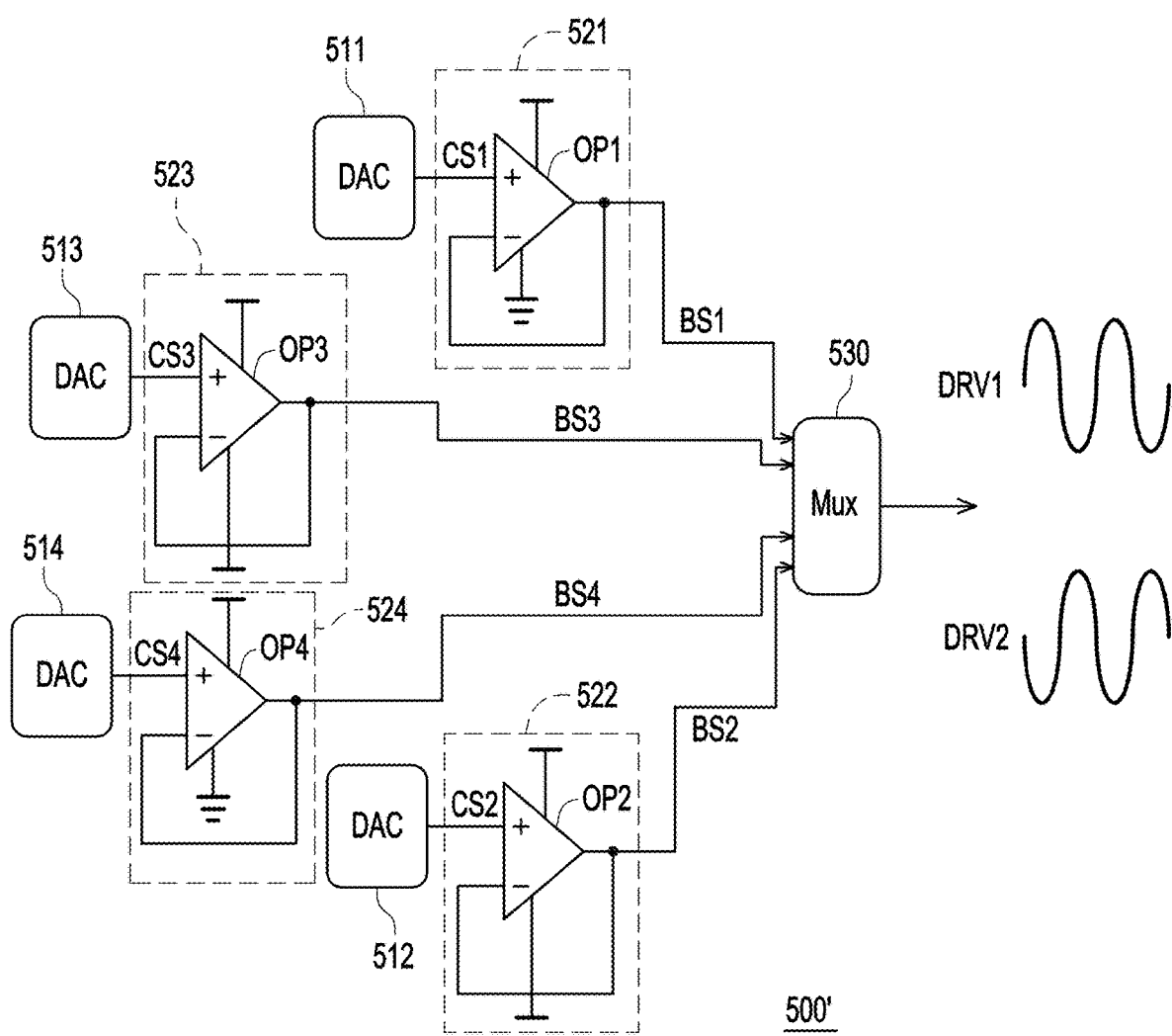
FIG. 5B illustrates a schematic diagram of a driving signal generator according to another embodiment of present disclosure.

Please refer to FIG. 5B, which illustrates a schematic diagram of a driving signal generator according to another embodiment of present disclosure. Different from the driving signal generator 500 in FIG. 5A, the driving signal generator 500' FIG. 5B further includes a third signal converting circuit 513, a fourth signal converting circuit 514, a third voltage buffer 523 and a fourth voltage buffer 524. The third signal converting circuit 513 and the fourth signal converting circuit 514 respectively generate converting signal CS3 and CS4. The third voltage buffer 523 and the fourth voltage buffer 524 respectively receive the converting signal CS3 and CS4, and respectively generate buffering signals BS3 and BS4. The third voltage buffer 523 and the fourth voltage buffer 524 are both voltage followers. The third voltage buffer 523 and the fourth voltage buffer 524 are respectively formed by operation amplifiers OP3 and OP4. Detail circuit structures of the first voltage buffer 521 to the fourth voltage buffer 524 are the same, and no more repeat description here.

Figure 5C:
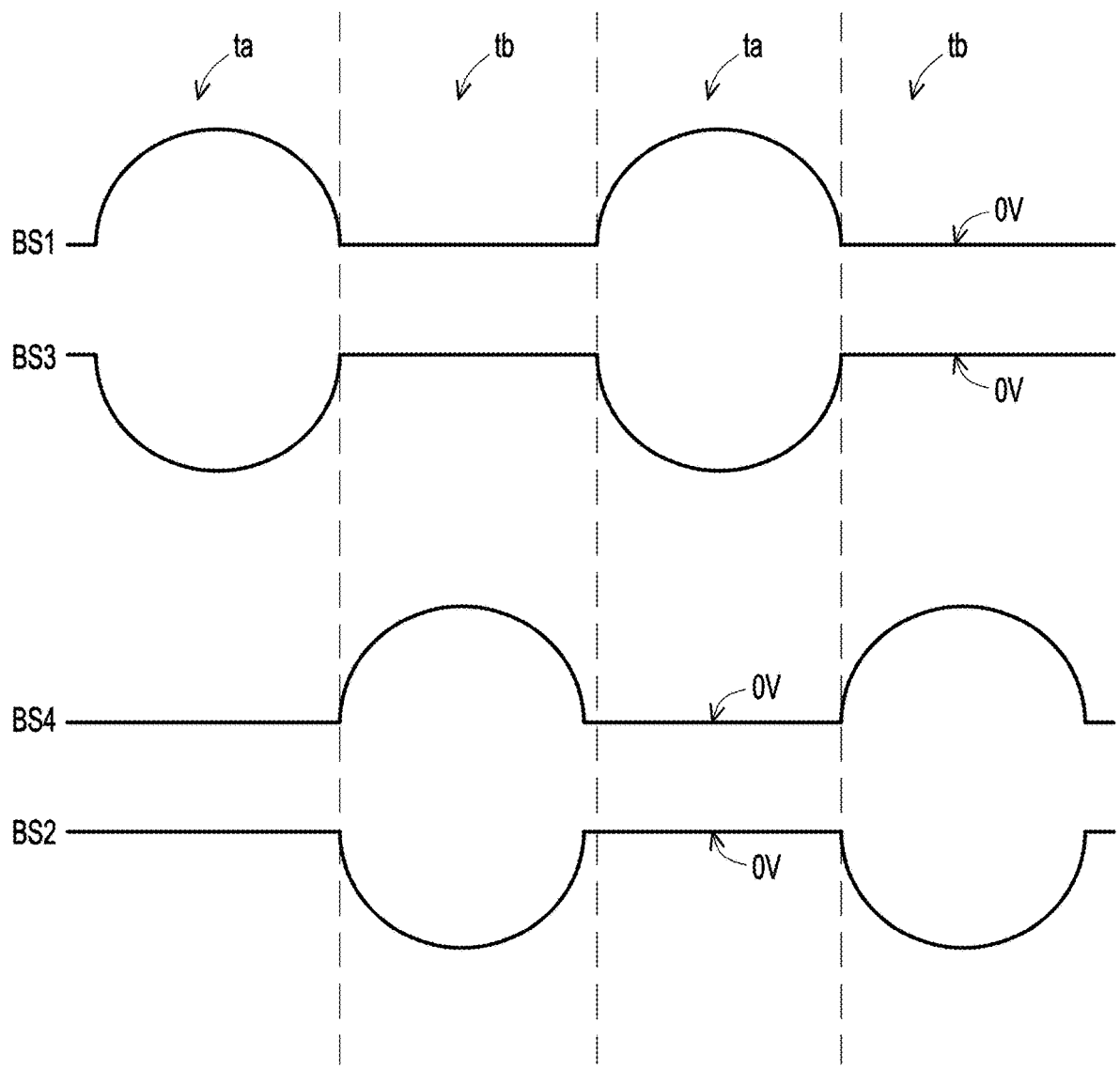
FIG. 5C is a waveform plot of the buffering signals of the driving signal generator 500' of the embodiment of FIG. 5B.

In here, please refer to FIG. 5B and FIG. 5C commonly, wherein FIG. 5C is a waveform plot of the buffering signals of the driving signal generator 500' of the embodiment of FIG. 5B. In FIG. 5C, during time periods ta, the buffering signal BS1 is a sine wave with a positive amplitude; the buffering signal BS2 is a sine wave with a negative amplitude; and the buffering signals BS3 and BS4 are kept on 0V. During time periods tb, the buffering signal BS4 is a sine wave with a positive amplitude; the buffering signal BS2 is a sine wave with a negative amplitude; and the buffering signals BS1 and BS2 are kept on 0V.

In this embodiment, there is a first phase difference between the buffering signal BS1 and the buffering signal BS3; there is a second phase difference between the buffering signal BS2 and the buffering signal BS4; and the first phase difference may be equal to the second phase difference.

Please refer to FIG. 5B again. In this embodiment, the multiplexer 530 receives the buffering signals BS1-BS4. The multiplexer 530 may alternatively select one of the buffering signals BS1 and BS2 to generate a driving signal DRV1, or the multiplexer 530 may alternatively select one of the buffering signals BS3 and BS4 to generate a driving signal DRV2, wherein there is a phase difference between the driving signal DRV1 and the driving signal DRV2.

Figure 6:
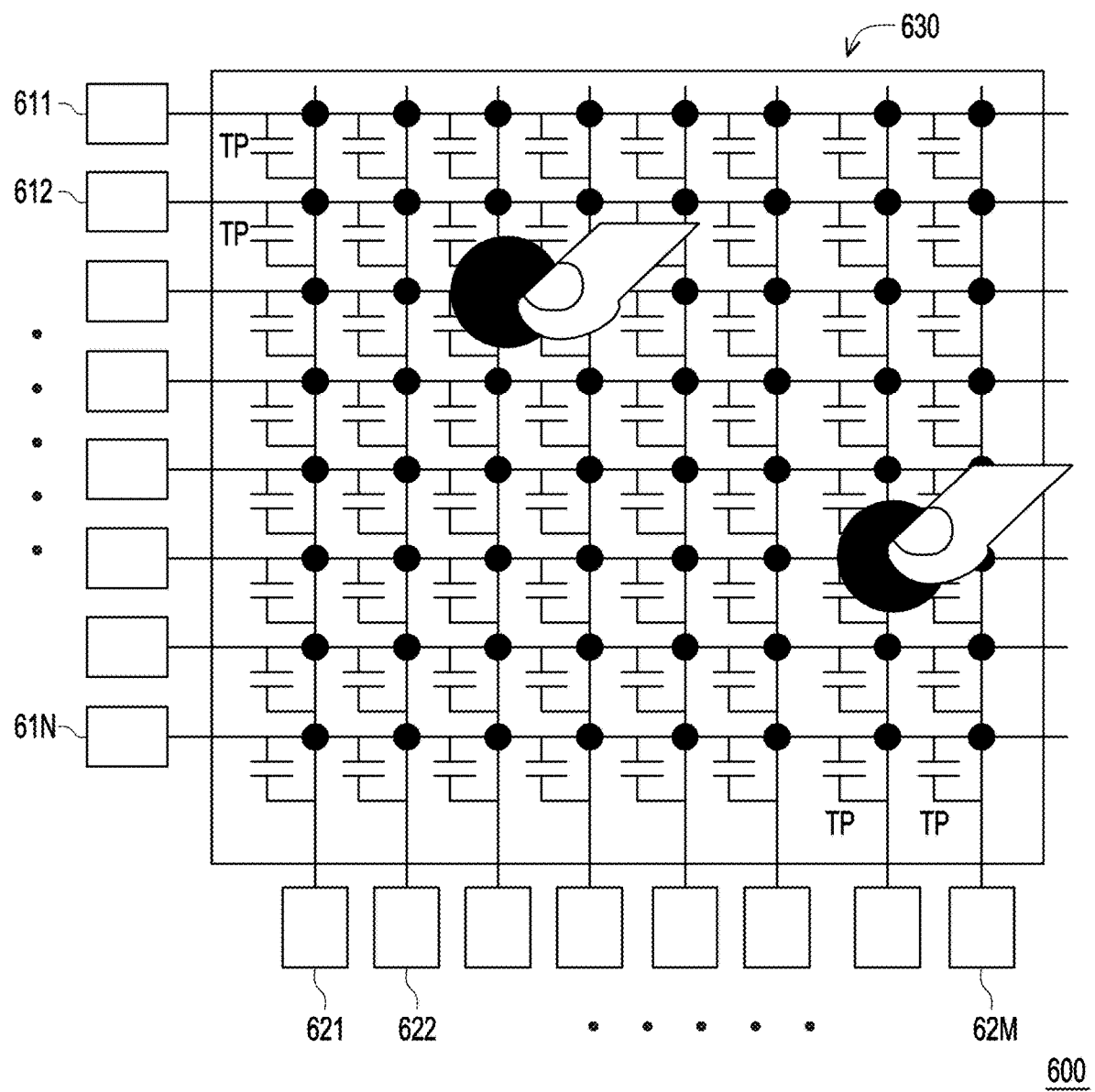
FIG. 6 illustrates a schematic plot of a touch sensing device according to an embodiment of present disclosure.

Please refer to FIG. 6, which illustrates a schematic plot of a touch sensing device according to an embodiment of present disclosure. The touch sensing device 600 may be applied on a touch display device. The touch sensing device 600 includes a touch detection circuit and a touch sensing array 630. The touch sensing array 630 may be disposed overlapped with a display panel of the touch display device. The display panel may be a liquid crystal display (LCD) panel, a light emitting diode (LED) display panel, or a organic LED (OLED) display panel. The touch detection circuit includes a plurality of driving signal generators 611-61N and a plurality of sensing signal receivers 621-62M. In some embodiment, the touch detection circuit may be integrated with a display driver of the display panel to from a touch with display driver (TDDI) circuit.

The touch sensing array 630 includes a plurality of touch sensing pads TP, and the touch sensing pads TP are arranged in an array. Each of the driving signal generators 611-61N corresponds to each of rows of the touch sensing array 630, and each of the sensing signal receivers 621-62M corresponds to each of columns of the touch sensing array 630. Each of the driving signal generators 611-61N generates driving signals to corresponding touch sensing pads TP, and the sensing signal receivers 621-62M respectively receive a plurality of sensing signals generated by corresponding touch sensing pads based on the driving signals during a sensing period.

In this embodiment, the touch sensing pads TP are capacitive touch sensing pads.

Figure 7:
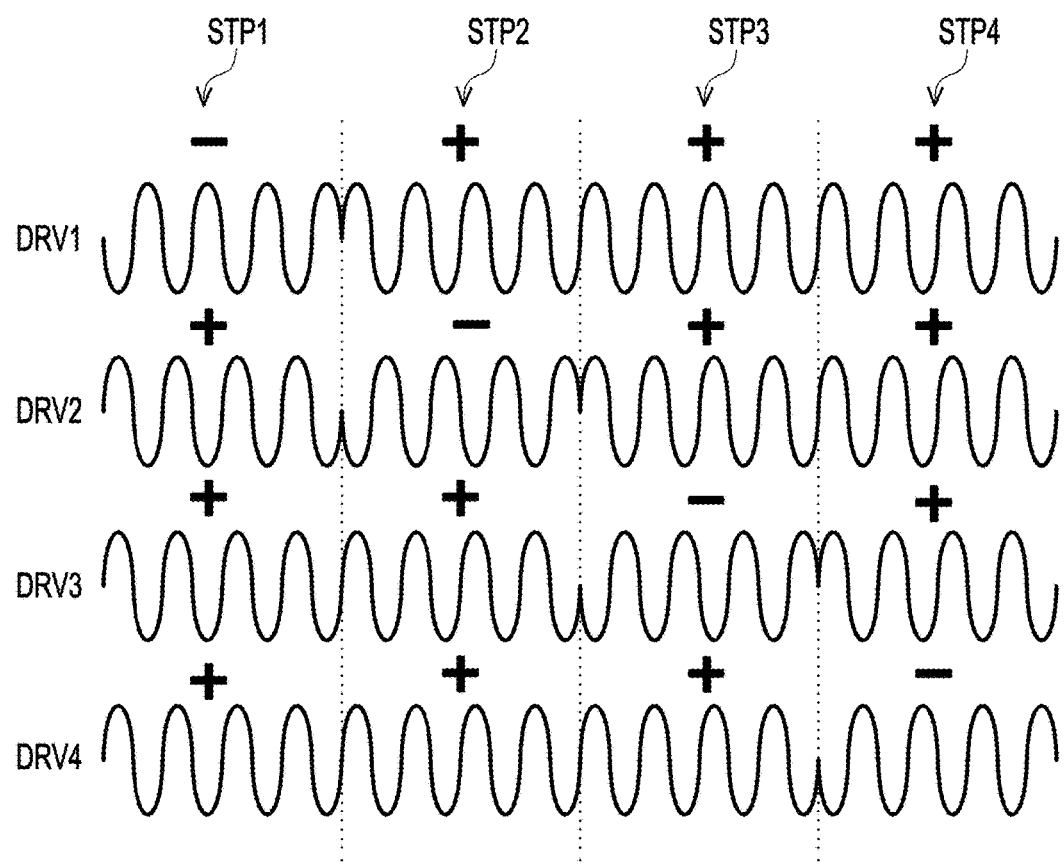
FIG. 7 illustrates a waveform plot of driving signals of touch sensing device according to an embodiment of present disclosure.

Please refer to FIG. 7, which illustrates a waveform plot of driving signals of touch sensing device according to an embodiment of present disclosure. In this embodiment, the driving signal generators may be grouped into a plurality of signal generator groups, and each of the signal generator groups may include 4 driving signal generators, and the 4 driving signal generators may respectively generate driving signals DRV1 to DRV4. In FIG. 7, one of the driving signals DRV1 to DRV4 may has a first phase and the others driving signals DRV1 to DRV4 may have a second phase during each of a plurality of touch sensing periods STP1-STP4, where the first phase is different from the second phase. In detail, during the touch sensing period STP1, the driving signal DRV1 has a negative phase, and the driving signals DRV2-DRV4 have a positive phase; during the touch sensing period STP2, the driving signal DRV2 has the negative phase, and the driving signals DRV1, DRV3 and DRV4 have the positive phase; during the touch sensing period STP3, the driving signal DRV3 has the negative phase, and the driving signals DRV1, DRV2 and DRV4 have the positive phase; and during the touch sensing period STP4, the driving signal DRV4 has the negative phase, and the driving signals DRV1-DRV3 have the positive phase.

Figure 8:
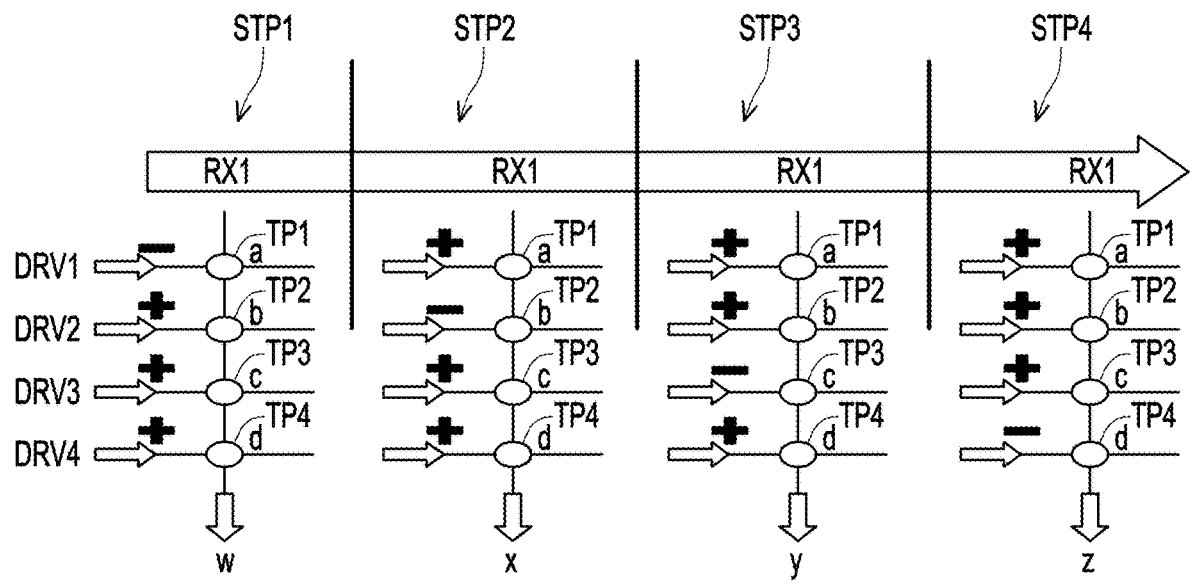
FIG. 8 illustrates a schematic diagram for touch sensing operation according to an embodiment of present disclosure.
Figure 9A:
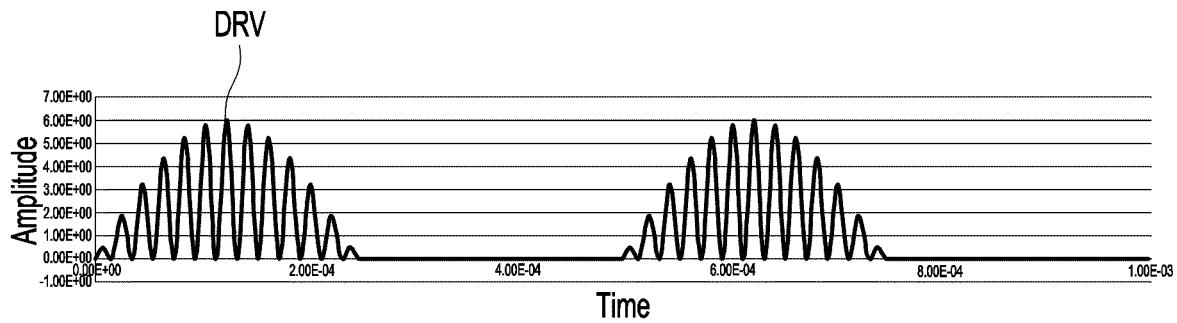
FIG. 9A and FIG. 9B respectively illustrate waveform plot and a frequency response diagram of driving signal for touch detection operation of prior art.
Figure 9B:
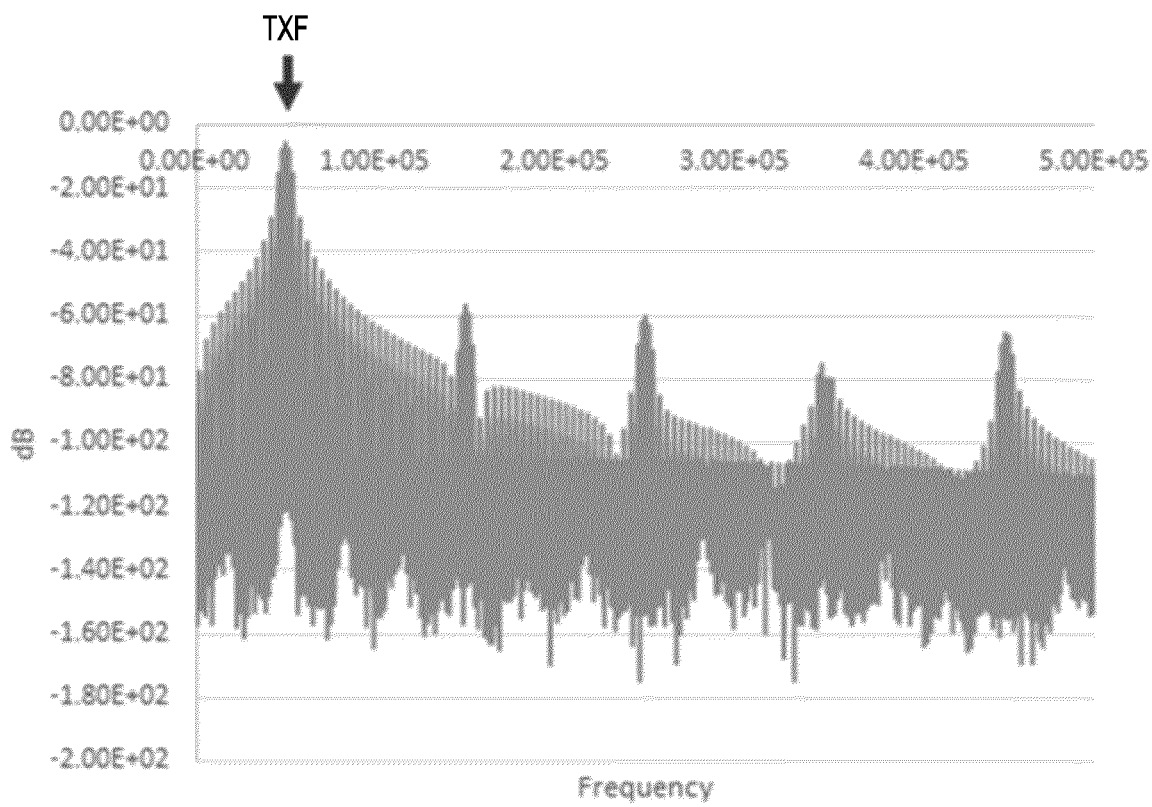

Please refer to FIG. 7 and FIG. 8 commonly, wherein FIG. 8 illustrates a schematic diagram for touch sensing operation according to an embodiment of present disclosure. In FIG. 8, during the touch sensing period STP1, the driving signals DRV1-DRV4 with phases −, +, +, + can be transported to touch sensing pads TP1-TP4. A sensing signal receiver RX1 corresponding to the touch sensing pads TP1-TP4 can receive sensing signal w from the touch sensing pads TP1-TP4 during the touch sensing period STP1. During the touch sensing period STP2, the driving signals DRV1-DRV4 with phases +, −, +, + can be transported to touch sensing pads TP1-TP4. The sensing signal receiver RX1 can receive sensing signal x from the touch sensing pads TP1-TP4 during the touch sensing period STP2. During the touch sensing period STP3, the driving signals DRV1-DRV4 with phases +, +, −, + can be transported to touch sensing pads TP1-TP4. The sensing signal receiver RX1 can receive sensing signal y from the touch sensing pads TP1-TP4 during the touch sensing period STP3. Moreover, during the touch sensing period STP4, the driving signals DRV1-DRV4 with phases +, +, +, − can be transported to touch sensing pads TP1-TP4. The sensing signal receiver RX1 can receive sensing signal z from the touch sensing pads TP1-TP4 during the touch sensing period STP4. In this embodiment, the sensing signals w, x, y, z can be generated according to corresponding driving signals DRV1 to DRV4 and capacitance variation values a, b, c, d of the touch sensing pads TP1-TP4, respectively.

A relationship between the sensing signals w, x, y, z and the capacitance variation values a, b, c, d can be represented by a formulation shown as below:

$$\begin{bmatrix} - & + & + & + \\ + & - & + & + \\ + & + & - & + \\ + & + & + & - \end{bmatrix} \begin{bmatrix} a \\ b \\ c \\ d \end{bmatrix} = \begin{bmatrix} w \\ x \\ y \\ z \end{bmatrix}$$

By expanding the matrix operation shown above, equation set can be obtained as below:

$$\begin{cases} a = \frac{1}{4}(-w + x + y + z) \\ b = \frac{1}{4}(w - x + y + z) \\ c = \frac{1}{4}(w + x - y + z) \\ d = \frac{1}{4}(w + x + y - z) \end{cases}$$

Such as that, by the equation set shown above, the capacitance variation values a, b, c, d can be obtained, and touching information can be generated according to the capacitance variation values a, b, c, d.

It should be noted here, in this embodiment, one of the driving signals DRV1-DRV4 is selected to have a different phase (the first phase). In some other embodiments, two or more of the driving signals DRV1-DRV4 may be selected to has the first phase. Furthermore, one signal generator group may have two or more driving signal generators. The 4 driving signal generators in one signal generator group in present embodiment is just an example for illustration, and not limit an invention scope of present disclosure.

In summary, present disclosure provides the driving signal generator to generate the driving signal swing between a positive voltage and a negative voltage for touch sensing detection operation. Such as that a swing magnitude of the driving signal can be reduced and an interference by low frequency noise can be reduced, and performance of touch sensing operation can be enhanced, too.

What is claimed is:

1. A touch detection circuit, comprising:
   at least one driving signal generator, receiving a first power voltage and a second power voltage as operation powers, wherein each of the at least one driving signal generator generates at least one driving signal with a sine wave based on the first power voltage and the second power voltage, and an amplitude of each of the at least one driving signal swings between a first voltage and a second voltage, wherein the first voltage is a positive voltage and the second voltage is a negative voltage,
   wherein each of the driving signal generator comprises:
      a first signal converting circuit, generating a first converting signal according to a first input code;
      a second signal converting circuit, generating a second converting signal according to a second input code;
      a first voltage buffer, coupled to the first signal converting circuit and generating a first buffering signal according to the first converting signal;
      a second voltage buffer, coupled to the second signal converting circuit and generating a second buffering signal according to the second converting signal;
      a multiplexer, coupled to the first voltage buffer and the second voltage buffer, and generating the driving signal by alternatively selecting the first buffering signal and the second buffering signal;
      a third signal converting circuit, generating a third converting signal according to a third input code;
      a fourth signal converting circuit, generating a fourth converting signal according to a fourth input code;
      a third voltage buffer, coupled to the third signal converting circuit and generating a third buffering signal according to the third converting signal; and
      a fourth voltage buffer, coupled to the fourth signal converting circuit and generating a fourth buffering signal according to the fourth converting signal,
      the multiplexer further generating the driving signal with a first phase by alternatively selecting the first buffering signal and the second buffering signal, or generating the driving signal with a second phase by alternatively selecting the third buffering signal and the fourth buffering signal,
      wherein the first phase is different from the second phase.

2. The touch detection circuit according to claim 1, wherein the first power voltage is a positive power voltage, and the second power voltage is a negative voltage.

3. The touch detection circuit according to claim 1, wherein an absolute value of the first power voltage is larger than an absolute value of the first voltage, and an absolute value of the second power voltage is larger than an absolute value of the second voltage.

4. The touch detection circuit according to claim 3, wherein the first voltage is the first power voltage multiplied by N, and the second voltage is the second power voltage multiplied by M, wherein N and M are positive real number smaller than 1, and N and M are same or different.

5. The touch detection circuit according to claim 1, wherein each of the first voltage buffer and the second voltage buffer is a voltage follower.

6. The touch detection circuit according to claim 1, wherein each of the first signal converting circuit and the second signal converting circuit is a digital to analog signal converter.

7. The touch detection circuit according to claim 1, wherein there is a first phase difference between the first buffering signal and the third buffering signal, there is a second phase difference between the second buffering signal and the fourth buffering signal, and the first phase difference is equal to the second phase difference.

8. The touch detection circuit according to claim 1, wherein the touch detection circuit is applied in a touch display device, and the touch display device has a display panel, wherein the display panel is a liquid crystal display (LCD) panel, a light emitting diode (LED) display panel, or an organic LED display panel.

9. The touch detection circuit according to claim 8, wherein the touch detection circuit is included in a touch with display driver (TDDI) circuit.

10. A touch detection circuit, comprising:
at least one driving signal generator, receiving a first power voltage and a second power voltage as operation powers, wherein each of the at least one driving signal generator generates at least one driving signal with a sine wave based on the first power voltage and the second power voltage, and an amplitude of each of the at least one driving signal swings between a first voltage and a second voltage, wherein the first voltage is a positive voltage and the second voltage is a negative voltage, wherein when number of the at least one driving signal generator is larger than 1, the plurality of driving signal generators are grouped into N driving signal generator groups, wherein each of the N driving signal generator groups provides a plurality of driving signals, and a phase of at least one of the driving signals is set to a first phase and the other driving signals are set to a second phase, wherein N is a positive integer, and the first phase is different from the second phase.

11. The touch detection circuit according to claim 10, wherein the phase of each of the driving signals is set to the first phase during each of a plurality of sensing periods.

12. The touch detection circuit according to claim 11, further comprising:
at least one sensing signal receiver, receiving a plurality of sensing signals generated by a plurality of touch sensing pads based on the driving signals during the plurality of sensing periods.

13. The touch detection circuit according to claim 12, wherein the at least one sensing signal receiver performs operation on the driving signals of the plurality of sensing periods to obtain touching information.

* * * * *